United States Patent
Tajima

[11] 3,748,022
[45] July 24, 1973

[54] REVERSE TELEPHOTO TYPE LENS PREVENTED FROM THE DETERIORATION OF IMAGE AT THE TIME OF CLOSE SHOT

[75] Inventor: Akira Tajima, Kawasaki, Japan

[73] Assignee: Canon Kabushiki Kaisha, Tokyo, Japan

[22] Filed: Mar. 3, 1972

[21] Appl. No.: 231,657

[30] Foreign Application Priority Data
Mar. 11, 1971 Japan .............................. 46/12786

[52] U.S. Cl. ............... 350/214, 350/176, 350/255
[51] Int. Cl. ............................................. G02b 9/64
[58] Field of Search .................... 350/214, 215, 186

[56] References Cited
UNITED STATES PATENTS

| | | | |
|---|---|---|---|
| 2,537,912 | 1/1951 | Reiss | 350/186 |
| 2,785,603 | 3/1957 | Cook | 350/214 |
| 3,512,874 | 5/1970 | Woltche | 350/214 |
| 3,635,546 | 1/1972 | Mori | 350/214 |

Primary Examiner—John K. Corbin
Attorney—David Toren et al.

[57] ABSTRACT

A reverse telephoto type lens adapted for preventing the deterioration of image at the time of close shot, comprising a front lens group having negative refractive power and a back lens group having positive refractive power, wherein the latter lens group is further divided into two positive lens groups, which are spaced by a variable air interval, and whole lens system may be shifted approximately in proportion to the variation of said interval.

11 Claims, 10 Drawing Figures

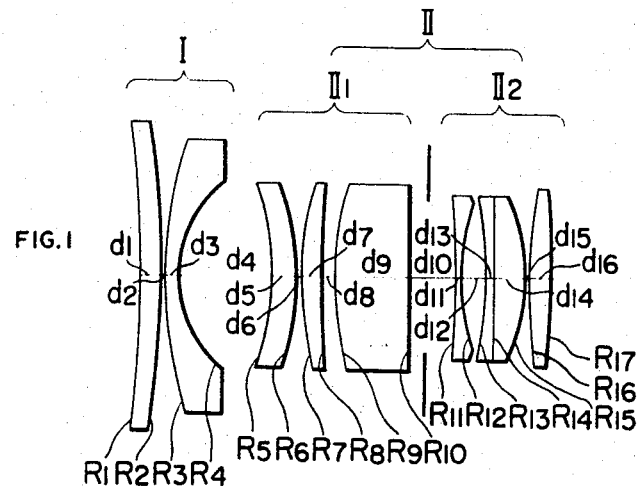
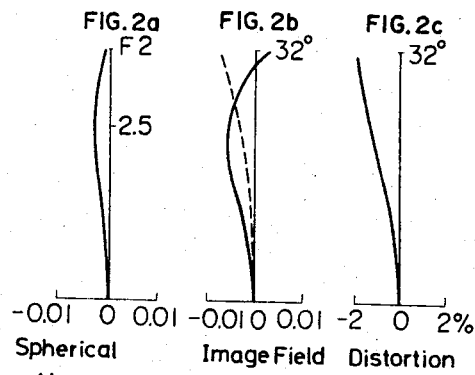
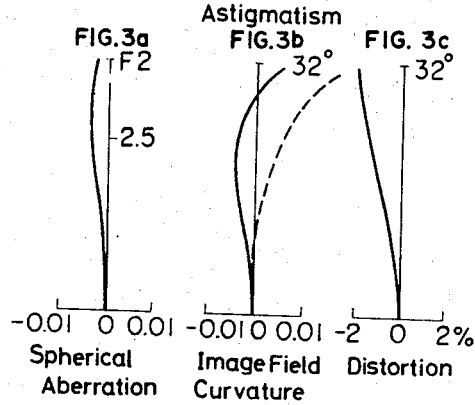
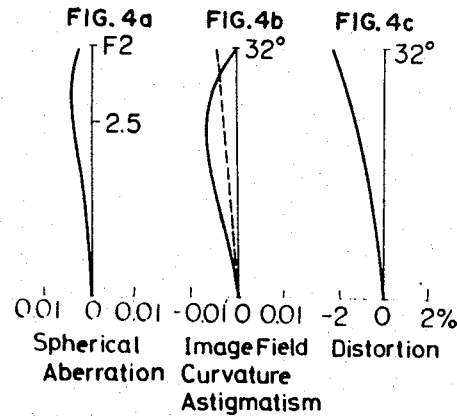

REVERSE TELEPHOTO TYPE LENS PREVENTED FROM THE DETERIORATION OF IMAGE AT THE TIME OF CLOSE SHOT

BACKGROUND OF INVENTION

A reverse telephoto type lens gives a long back focus, so that it is favorable for use as a wide angle lens in a single-lens reflex camera. However, at the time of close shot, remarkable deterioration of the image is found from the intermediate portion to the peripheral portion of a picture, and particularly it is undesirable and defective when it is applied to close shot, copying and the like.

To prevent such a defect, there is proposed that an air interval, a portion in a lens system, is made variable, and the whole system is shifted forward, and at the same time said air interval is changed by interlocking with the movement of said system, thus to prevent the fluctuation of the image surface, namely the variation of curvature of image field and astigmatism. The present invention relates to such a kind of lens system.

SUMMARY OF INVENTION

The present invention relates to a reverse telephoto type lens which is prevented from the deterioration of image at the time of close shot.

The characteristic feature of the present invention resides in that in a reverse telephoto type lens comprising a front part lens group I having negative refractive power and a back part lens group II having positive refractive power, said lens group II is further divided into two positive lens groups $II_1$ and $II_2$ spaced by an air interval, which is made variable, and the whole lens system is made to be shifted forward as well as said air interval is made to be changed approximately in proportion to the amount of forward shifting at the time of close shot, thus the deterioration of image may be prevented.

Now, let the refractive power of the whole lens system be 1, that of the lens group I be $\phi_1$, that of lens group $II_1$ be $\phi_2$, and the interval of principal point between the lens groups I and $II_1$ be $D$, then the condition of $$0.35 < \phi_1 + \phi_2 - D\phi_1\phi_2 < 1.0$$

is made to be satisfied, as well as said air interval is made variable, and the whole lens system is made to be shifted forward at the time of photographing at infinite distance down to close shot of 0.2 magnification and its air interval is made to be changed within a range of not more than 5 percent of the focal distance of the whole system in proportion to the amount of the forward shifting at the time of close shot.

In said conditional inequality, the amount of $\phi_1 + \phi_2 - D\phi_1\phi_2$ denotes an angle formed by a light beam and the optical axis when the beam passes said air interval, in case the beam from an object point on the axis of infinite distance comes in the lens system at the height of 1, and let said angle be $\alpha$, said conditional inequality becomes $$0.35 < \alpha < 1.0$$

On the other hand, it is important conditions for preventing the variation of image field by changing the air interval at the time of close shot that (1) the variation of image field, i.e., the curvature of image field and astigmatism are especially corrected and other aberrations are almost unchanged, and (2) the focal distance and F-number of whole lens system are not changed.

These conditions may be clearly satisfied by an interval when the beam on the axis and the optical axis are approximately parallel, i.e., by an interval in case $\alpha \approx 0$, however, the present invention is based on the knowledge that said conditions may be also satisfied in a range of $\alpha$ being 0.35 – 1.0.

Commonly, it is understood that as the absolute value of the angle $\alpha$ becomes larger, the inclination of the beam becomes larger, and if the interval is changed, the variation of aberration, focal distance and the like may be caused, however, if said understanding is examined in detail, the interval having convergent light flux effects smaller variations of aberration and focal distance compared with the interval having divergent light flux. The reason thereof consists in that as $\alpha$ is positive and becomes larger, so the focal distance of the lens group after the corrected interval, i.e. of $II_2$, becomes longer, and in case of $\alpha=1$, the focal distance of $II_2$ becomes infinity, thus the focal distance of whole system remains utterly unchanged.

Therefore, as is the case of the present invention, if the back group II of positive refraction power to the front group I of negative refraction power is divided into two groups $II_1$, $II_2$ of positive refraction power and make their refraction power $\phi_1$, $\phi_2$ and interval of principal point $D$ to have the relation of $0.35 < \phi_1 + \phi_2 - D\phi_1\phi_2 < 1$, the correction of the characteristics of image field of whole lens system at the time of close shot becomes possible by changing the air interval between two lens groups of the back group, and if the lower limit is exceeded, said correction becomes difficult, while if the upper limit is over, by changing the corrected interval, remarkable increase of spherical aberration will result.

In the present invention, the range of magnification is limited up to 0.2 times and the corrected air interval is limited within 5 percent of the focal distance of the whole lens system, the reason thereof will be explained as follows.

If the range of magnification exceeds 0.2, the variation of aberration will remarkably increase and to correct such variation by means of said air interval, the amount of correction becomes large, thus such mechanical defects as to extend helicoid mechanism and to collide with stop mechanism will be caused, and at the same time, from the optical viewpoint, the aberration correction of curvature of image field becomes insufficient, and what is worse, harmful astigmatism and coma aberration will increase, resulting in the deterioration of image.

BRIEF DESCRIPTION OF DRAWINGS

FIG. 1 shows a construction of lens according to the present invention as an embodiment thereof.

FIGS. 2a–2c show an aberration diagram in case of infinite distance photographing in said embodiment.

FIGS. 3a–3c show an aberration diagram in case of close shot with the magnification of 0.118 by shifting forward of the whole lens system as usual, in said embodiment.

FIGS. 4a–4c show an aberration diagram in case of close shot by correcting the variable lens interval.

DESCRIPTION OF THE PREFERRED EMBODIMENTS

Numerical examples of the embodiment according to the present invention will be shown as follows:

R : radius of curvature of each refraction surface, in order of numerals.

d : thickness of each lens on axis or air interval, in order of numerals

N : refractive index of each lens, in order of numerals.

V : Abbe's number of each lens, in order of numerals.

$f = 1 \quad 1:2 \quad 2\omega = 64°$
back focus = 1.1066
$R_1 = -5.776$
$d_1 = 0.0975$
$R_2 = -3.231$
$d_2 = 0.0028 \quad N_1 = 1.697 \quad V_1 = 48.5$
$R_3 = 1.816$
$d_3 = 0.0418$
$R_4 = 0.4944$
$d_4 = 0.3462 \quad N_2 = 1.51633 \quad V_2 = 64.0$
$R_5 = -0.9749$
$d_5 = 0.0972$
$R_6 = -1.082$
$d_6 = 0.0029 \quad N_3 = 1.70154 \quad V_3 = 41.1$
$R_7 = 1.072$
$d_7 = 0.0960$
$R_8 = 15.83$
$d_8 = 0.0419 \quad N_4 = 1.7 \quad V_4 = 48.0$
$R_9 = 1.333$
$d_9 = 0.2890$
$R_{10} = 124.1$
$d_{10}$ = variable* Variable air interval $D_{10}$ is 0.1541 at the object distance of ∞ and is 0.1345 at the time of close shot with a magnification of 0.118
$N_5 = 1.7737 \quad V_5 = 49.2$
$R_{11} = -3.877$
$d_{11} = 0.0279$
$R_{12} = 0.8554$
$d_{12} = 0.0905 \quad N_6 = 1.76182 \quad V_6 = 26.5$
$R_{13} = -1.170$
$d_{13} = 0.028$
$R_{14} = 13.96$
$d_{14} = 0.1226 \quad N_7 = 1.80518 \quad V_7 = 25.4$
$R_{15} = -0.6989$
$d_{15} = 0.0029 \quad N_8 = 1.7737 \quad V_8 = 49.2$
$R_{16} = 1.970$
$d_{16} = 0.0827 \quad N_9 = 1.8061 \quad V_9 = 40.8$
$R_{17} = -3.278$ In the above-mentioned embodiment,
$\phi_1 = -0.6575, \quad \phi_2 = 1.1549, \quad D = 0.4762 \quad \phi_1 + \phi_2 - D\phi_1\phi_2 = 0.8590$ FIG. 2 shows an aberration diagram in case of infinite distance photographing in said embodiment and each aberration is successfully corrected, however, if, under this condition of air interval $D_{10}$ as it is and by shifting whole lens system as usual, the close shot is effected, its condition of aberration becomes as shown in FIG. 3, particularly the astigmatism and the curvature of image field will be remarkably deteriorated. In this case, if the air interval $D_{10}$ is changed as above-mentioned simultaneously with the shifting of whole lens system, then the condition of aberration becomes as shown in FIG. 4, thus the astigmatism and the curvature of image field will not be deteriorated.

What is claimed is:

1. A reverse telephoto lens, comprising a front lens group I having a negative refractive power and a back lens group II having a positive refractive power, said lens group II being divided into two positive lens groups II $_1$ and II $_2$ spaced from each other by an air interval, said air interval being variable, said two groups together being shiftable along the axis, the distance between the lens groups II$_1$ and II$_2$ being variable during shift of said groups so as to change the air interval approximately in proportion to the amount of shift so as to prevent deterioration of the image, said groups having a plurality of individual lenses, the following conditions being satisfied for the lenses:

$R_1 = -5.776$
$d_1 = 0.0975$
$R_2 = -3.231$
$d_2 = 0.0028 \quad N_1 = 1.697 \quad V_1 = 48.5$
$R_3 = 1.816$
$d_3 = 0.0418$
$R_4 = 0.4944$
$d_4 = 0.3462 \quad N_2 = 1.51633 \quad V_2 = 64.0$
$R_5 = -0.9749$
$d_5 = 0.0972$
$R_6 = -1.082$
$d_6 = 0.0029 \quad N_3 = 1.70154 \quad V_3 = 41.1$
$R_7 = 1.072$
$d_7 = 0.0960$
$R_8 = 15.83$
$d_8 = 0.0419 \quad N_4 = 1.7 \quad V_4 = 48.0$
$R_9 = 1.333$
$d_9 = 0.2890$
$R_{10} = 124.1$
$d_{10}$ = variable* Variable air interval $D_{10}$ is 0.1541 at the object distance of ∞ and is 0.1345 at the time of close shot with a magnification of 0.118
$N_5 = 1.7737 \quad V_5 = 49.2$
$R_{11} = -3.877$
$d_{11} = 0.0279$
$R_{12} = 0.8554$
$d_{12} = 0.0905 \quad N_6 = 1.76182 \quad V_6 = 26.5$
$R_{13} = -1.170$
$d_{13} = 0.028$
$R_{14} = 13.96$
$d_{14} = 0.1226 \quad N_7 = 1.80518 \quad V_7 = 25.4$
$R_{15} = -0.6989$
$d_{15} = 0.0029 \quad N_8 = 1.7737 \quad V_8 = 49.2$
$R_{16} = 1.970$
$d_{16} = 0.0827 \quad N_9 = 1.8061 \quad V_9 = 40.8$
$R_{17} = -3.278$
$f = 1 \quad 1:2 \quad 2\omega = 64°$
back focus = 1.1066
wherein, R : radius of curvature of each refraction surface, in order of numerals.

d : thickness of each lens on axis or air interval, in order of numerals.

N : refractive index of each lens, in order of numerals.

V : Abbe's number of each lens, in order of numerals.

2. A lens as in claim 1, wherein the groups are shifted forward for close-up shots and the air interval is changed approximately in proportion to the amount of forward shift for a close-up shot.

3. A lens system, comprising front lens means having a negative refractive power, back lens means having a positive refractive power, said front lens means and said back lens means togther forming an inverted telephoto type lens, said back lens means having two positive lens groups spaced from each other by an air interval, said lens groups being movable relative to each other so as to vary the air interval, said first lens means and said second lens means being shiftable along the axis for focusing, said groups being movable relative to each other so as to change the interval approximately in proportion to the shift of said first and second lens means for at least a portion of the movement range of said lens means and thereby prevent deterioration of an image being formed.

4. A system as in claim 3, wherein said first and second lens means may be moved forward together for focusing on a close-up object, said groups being movable relative to each other so as to change the air interval proportional to the shift of said lens means in the range of focusing for a close-up shot.

5. A lens system as in claim 3, wherein said front lens means has a forward element, said forward element having a forward surface facing an object whose image is to be formed, said forward surface being concave.

6. A system as in claim 5, wherein said first and second lens means may be moved forward together for focusing on a close-up object, said groups being movable relative to each other so as to change the air interval proportional to the shift of said lens means in the range of focusing for a close-up shot.

7. A system as in claim 3, wherein said first and second lens means satisfy a condition $$0.35 < \phi_1 + \phi_2 - D_1\phi_1\phi_2 < 1.0$$

when the refractive power of said front lens means and said back lens means together are 1 and the refractive power of the front lens means is $\phi_1$, the refractive power of said back lens means is $100_2$, and the interval between the principal point of said front lens means and 1 of said lens groups is $D$.

8. A lens system as in claim 3, wherein when the magnification of the front lens means and the back lens means together is less than 0.2 the corrected air interval is less than 5 percent of the focal distance of said inverted telephoto lens together.

9. A system as in claim 8, wherein said first and second lens means satisfy a condition $$0.35 < \phi_1 + \phi_2 - D_1\phi_1\phi_2 < 1.0$$

the refractive power of said front lens means and said back lens means together are 1 and lthe refractive power of the front lens means is $\phi_1$, the refractive power of said back lens means being $\phi_2$, and the interval between the principal point of said front lens means and 1 of said lens groups is $D$.

10. A system as in claim 3, wherein said first and second lens means satisfy a condition, $$0.35 < \phi_1 + \phi_2 - D\phi_1\phi_2 < 1.0$$

when the refractive power of said front lens means and said back lens means together are 1 and the refractive power of the front lens means is $\phi_1$, the refractive power of said back lens means being $\phi_2$, and the interval between the principal point of said front lens means and 1 of said lens groups is $D$.

11. A system as in claim 10, wherein when the magnification of the front lens means and the back lens means together is less than 0.2 the corrected air interval is less than 5 percent of the focal distance of said inverted telephoto lens together.

* * * * *